(12) United States Patent
Belden et al.

(10) Patent No.: US 9,140,907 B2
(45) Date of Patent: Sep. 22, 2015

(54) CONTACT LENS

(71) Applicant: Vision Discoveries, LLC, Indianapolis, IN (US)

(72) Inventors: Trevor J. Belden, Indianapolis, IN (US); Gibson T. Gilmore, Indianpolis, IN (US)

(73) Assignee: Vision Discoveries, LLC, Indianapolis, IN (US)

( * ) Notice: Subject to any disclaimer, the term of this patent is extended or adjusted under 35 U.S.C. 154(b) by 158 days.

(21) Appl. No.: 13/767,956

(22) Filed: Feb. 15, 2013

(65) Prior Publication Data

US 2013/0215375 A1    Aug. 22, 2013

Related U.S. Application Data

(60) Provisional application No. 61/599,511, filed on Feb. 16, 2012.

(51) Int. Cl.
*G02C 7/04* (2006.01)
*G02C 7/02* (2006.01)

(52) U.S. Cl.
CPC . *G02C 7/021* (2013.01); *G02C 7/04* (2013.01)

(58) Field of Classification Search
CPC .......... G02C 7/04; G02C 7/047; G02C 7/048; G02C 7/049
USPC ................ 351/159.02, 159.28, 159.8, 159.81
See application file for complete search history.

(56) References Cited

U.S. PATENT DOCUMENTS

| 4,193,671 | A | 3/1980 | Erickson et al. |
| 4,525,044 | A | 6/1985 | Bauman |
| 4,616,910 | A | 10/1986 | Klein |
| 5,467,149 | A | 11/1995 | Morrison et al. |
| 6,079,826 | A * | 6/2000 | Appleton et al. ........ 351/159.69 |
| RE37,071 | E | 2/2001 | Gabrielian et al. |
| 2006/0001828 | A1* | 1/2006 | Duggan et al. ............ 351/160 R |
| 2009/0059166 | A1* | 3/2009 | Suzuki et al. ............. 351/160 R |

* cited by examiner

*Primary Examiner* — Scott J Sugarman
(74) *Attorney, Agent, or Firm* — Faegre Baker Daniels LLP

(57) ABSTRACT

A contact lens comprising first and second orientation indicia to determine an orientation of the contact lens.

6 Claims, 3 Drawing Sheets

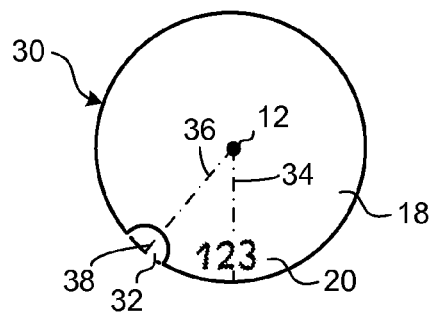
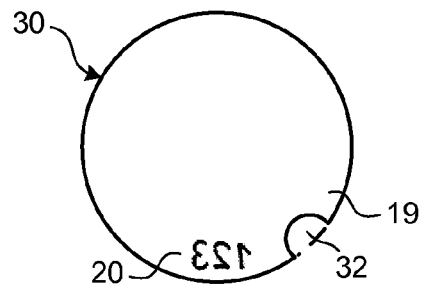
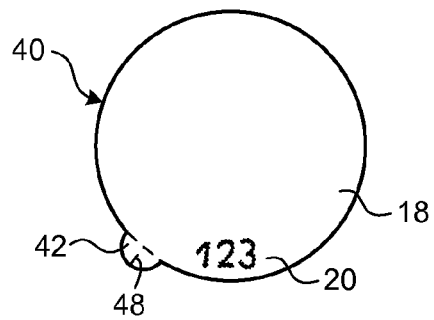
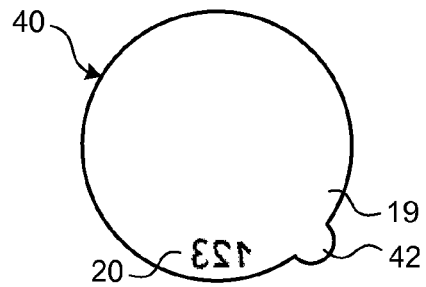
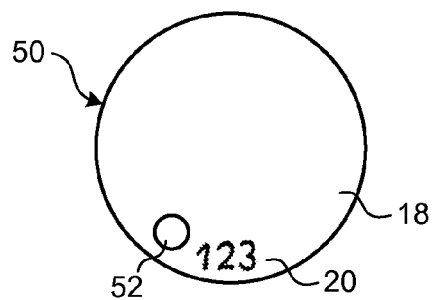
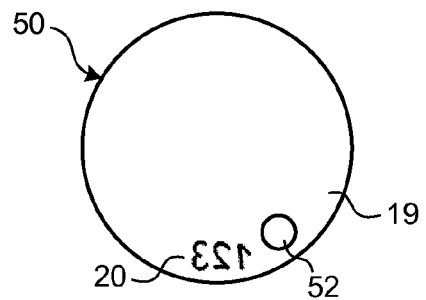

CONTACT LENS

CROSS-REFERENCE TO RELATED APPLICATIONS

This application claims the benefit of priority from U.S. Patent Application Ser. No. 61/599,511 entitled CONTACT LENS filed Feb. 16, 2012, the disclosure of which is expressly incorporated by reference herein in its entirety.

FIELD OF THE DISCLOSURE

The present disclosure relates generally to optical lenses and, more particularly, to contact lenses.

BACKGROUND

In order to function properly, a contact lens must be placed right side in (as opposed to inside out) on the eye. It can be difficult to determine if a contact lens is properly oriented prior to placement on the eye. The problem is exacerbated by the use of soft contact lenses due to their thin thickness and pliability. Even experienced contact lens users and medical practitioners sometimes find it difficult to determine the correct orientation of the contact lens.

There is a need to provide an aid so people, including users and medical practitioners, can easily determine the correct orientation of a contact lens prior to placing the lens on the eye of the user.

SUMMARY OF EMBODIMENTS OF THE DISCLOSURE

A contact lens and methods of making and placing a contact lens are disclosed. In one embodiment, a contact lens includes: a contact surface configured to contact an eye of a user; an outside surface opposite the contact surface; a first orientation indicia that is visually detectable; and a second orientation indicia that is visually detectable, the second orientation indicia positioned on the contact lens relative to the first orientation indicia in a predetermined relationship indicative of an orientation of the contact lens.

In one embodiment, a method of making a contact lens includes providing a first orientation indicia on the contact lens, the first orientation indicia being visually detectable; defining a predetermined relationship indicative of an orientation of the contact lens; and providing a second orientation indicia on the contact lens based on the predetermined relationship, the second orientation indicia being visually detectable.

In one embodiment, a method of placing a contact lens includes obtaining a contact lens having a contact surface, an outside surface opposite the contact surface, a first orientation indicia that is visually detectable, and a second orientation indicia that is visually detectable; sensing the second orientation indicia; sensing the presence or absence of the first orientation indicia at a position indicative of a proper orientation of the contact lens; if the first orientation indicia is present, placing the contact lens on the eye; and if the first orientation indicia is absent, reversing the orientation of the contact lens and then placing the contact lens on the eye.

BRIEF DESCRIPTION OF THE DRAWINGS

The features of this invention, and the manner of attaining them, will become more apparent and the invention itself will be better understood by reference to the following description of the disclosed embodiments taken in conjunction with the accompanying drawings.

FIGS. 3A and 3B are elevation views of a contact lens in accordance with an example set forth in the disclosure;
FIGS. 4A and 4B are elevation views of another contact lens in accordance with an example set forth in the disclosure;
FIGS. 5A and 5B are elevation views of yet another contact lens in accordance with an example set forth in the disclosure.

Figure 1A:
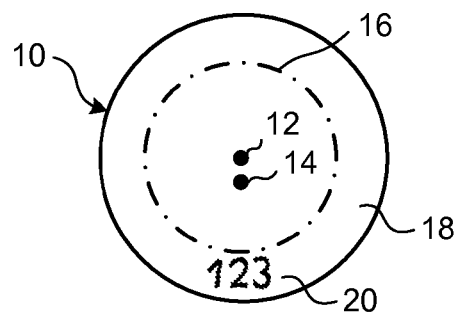
FIGS. 1A and 1B are elevation views of a contact lens.

Corresponding reference characters indicate corresponding parts throughout the several views. Although the drawings represent embodiments of the present disclosure, the drawings are not necessarily to scale and certain features may be exaggerated to better illustrate and explain the embodiments. The exemplifications set out herein illustrate embodiments of the disclosure in several forms and such exemplification is not to be construed as limiting the scope of the invention in any manner.

DETAILED DESCRIPTION

The embodiments discussed below are not intended to be exhaustive or limit the invention to the precise forms disclosed in the following detailed description. Rather, the embodiments are chosen and described so that others skilled in the art may utilize their teachings.

Figure 1B:
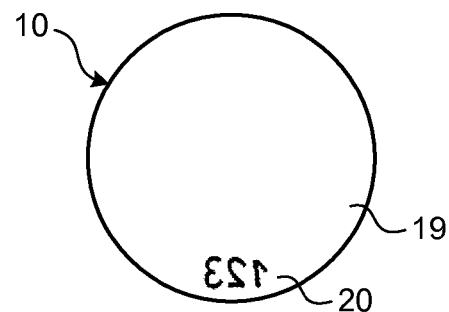
Figure 2:
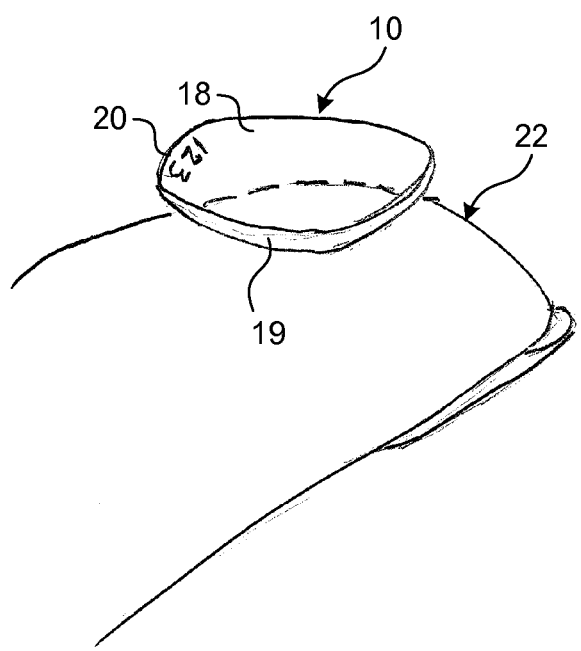
FIG. 2 is a perspective view of the contact lens of FIG. 1 supported by a fingertip of a user.

Referring to FIGS. 1A, 1B and 2, a contact lens 10 is illustrated having a geometric center 12, an optical center 14, a central area 16 defining a peripheral area adjacent the periphery of the lens, a contact lens surface 18 and an outside surface 19. Also shown is a first orientation indicia 20, exemplified by the number 123, and a fingertip 22. In one example, the diameter of central area 16 is about half the diameter of contact lens 10.

As illustrated in FIG. 2, contact lens 10 is properly oriented with outside surface 19 supporting contact lens 10 on fingertip 22 and inside surface 18 facing away from fingertip 22. In other words, if the "123" appears normal, as shown in FIGS. 1A and 2, then lens 10 is correctly oriented and ready to be placed on the eye. If the "123" appears backward, as shown in FIG. 1B, then contact lens 10 is inside out. As show in FIG. 1A, the first orientation indicia 20 is aligned with geometric center 12 and optical center 14. In a variation of contact lens 10, geometric center 12 and optical center 14 are concentric. In another variation, first orientation indicia 20 is not aligned with geometric center 12 and optical center 14. Of course, a contact lens user looking at contact lens 10 will recognize that first orientation indicia 20 is properly oriented so long as the user can actually identify first orientation indicia 20.

According to exemplary contact lens embodiments illustrated in FIGS. 3A to 9, a second orientation indicia is provided to help identify first orientation indicia 20. The second orientation indicia cooperates with the first orientation indicia according to an orientation rule to indicate proper orientation of the contact lens. FIGS. 3A and 3B illustrate a cutout 32 of a contact lens 30 placed on the left side of first orientation indicia 20. Advantageously, a user can initially detect a second orientation indicia, e.g. cutout 32, and based on the rule, look to the right of second orientation indicia, e.g. cutout 32, to determine the presence or absence of first orientation indicia 20. The orientation of the text (or image, as the case might be) of first orientation indicia 20 further confirms that contact lens 30 is properly oriented. Lines 34 and 36 pass through the center of geometric center 12 and first orientation indicia 20 and the second orientation indicia, e.g. cutout 32, and define an angle which corresponds to a circumferential offset between them. The positional relationship between first orientation indicia 20 and the second orientation indicia, e.g. cutout 34, including the offset, corresponds to the orientation of the lens. Line 38 designates the radial distance of cutout 32 which is the distance from the circumference of the contact lens to the point on the edge of the cutout furthest away from the circumference.

In one variation, illustrated by contact lens 40 shown in FIGS. 4A and 4B, cutout 32 is substituted with a protrusion 42. Line 48 designates the radial distance of protrusion 42. In one example, the radial distance of the second orientation indicia is more than 2.5 millimeters and less than 5 millimeters. In another example, the radial distance is less than 3 millimeters. In another form thereof, second orientation indicia 30 has a peripheral shape which is a portion of a geometric shape. Cutout 32 and protrusion 42 have peripheral shapes which are portions of a circular shape. Exemplary geometric shapes include, without limitation, circular, rectangular, conical, frusto-conical, square and oval.

Referring to FIGS. 5A and 5B, in a yet further embodiment of a contact lens the second orientation indicia comprises an aperture. An aperture 52 having a geometric shape, illustratively a circle, is shown. In other examples alternative geometric shapes, such as those described above, are provided.

Figure 6:
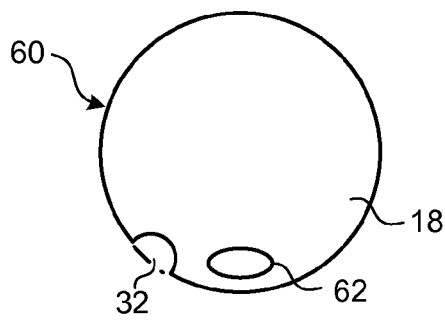
FIGS. 6 to 9 are elevation views of additional contact lenses in accordance with examples set forth in the disclosure.
Figure 7:
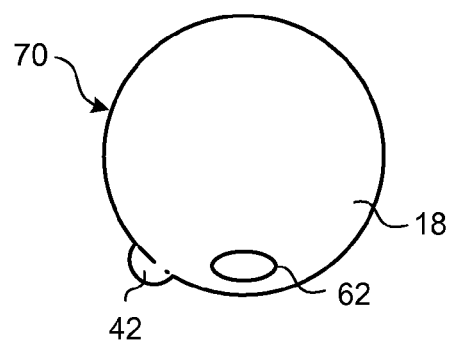
Figure 8:
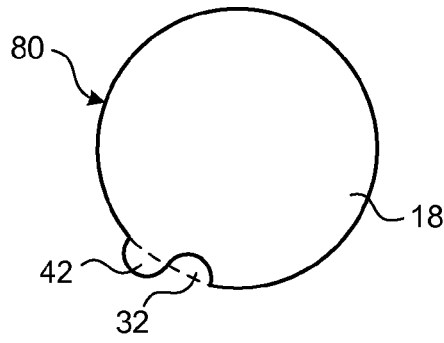
Figure 9:
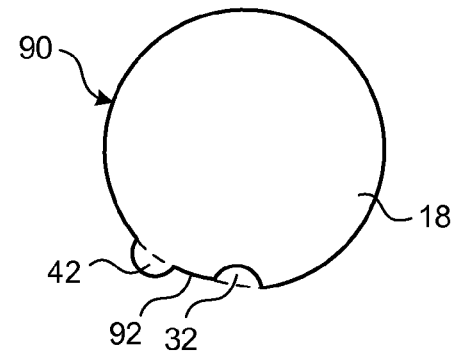

Referring to FIG. 6, in another embodiment of a contact lens the first orientation indicia comprises an aperture and the second orientation indicia comprises a cutout. Of course, the characteristics of the first and second orientation indicia can be reversed if the rule is also reversed. An aperture 62 having a geometric shape, illustratively an oval, is shown in a contact lens 60. The second orientation indicia comprises cutout 32. In a variation thereof illustrated in FIG. 7, the second orientation indicia comprises protrusion 42 disposed as shown on contact lens 70. In a further variation thereof shown as contact lens 80 in FIG. 8, the first and second orientation indicia comprise cutout 32 positioned adjacent protrusion 42. In a variation thereof illustrated in FIG. 9, a peripheral portion 92 separates cutout 32 from protrusion 42.

While in the embodiments described above and illustrated in the drawings the second orientation indicia is positioned to the left of the first orientation indicia, the rule can be reversed so that the second orientation indicia is positioned to the right of the first orientation indicia to indicate proper orientation. Furthermore, any of the illustrated first and second orientation indicia may substitute another orientation indicia. The orientation indicia maybe molded at the time the contact lens is made, or may be cut from a formed contact lens. Exemplary cutting technologies include laser and water jet. In one variation, a laser beam is used to provide a first orientation indicia a shown in FIGS. 1A and 1B and also to cut the second orientation indicia.

While the invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A contact lens comprising:
   a contact surface configured to contact an eye of a user;
   an outside surface opposite the contact surface;
   a first orientation indicia that is visually detectable; and
   a second orientation indicia that is visually detectable, the second orientation indicia positioned on the contact lens relative to the first orientation indicia in a predetermined relationship indicative of an orientation of the contact lens;
   wherein except for the second orientation indicia the contact lens comprises a geometric shape, and the second orientation indicia comprises one of an aperture within the geometric shape, a protrusion extending along the contact surface beyond the geometric shape, and a cutout, and
   wherein the second orientation indicia is circumferentially offset from the first orientation indicia.

2. A contact lens as in claim 1, wherein the first orientation indicia comprises one of an aperture, a protrusion extending along the contact surface, and a cutout.

3. A method of making a contact lens, the method comprising:
   providing a first orientation indicia on the contact lens, the first orientation indicia being visually detectable;
   defining a predetermined relationship indicative of an orientation of the contact lens; and
   providing a second orientation indicia on the contact lens based on the predetermined relationship, the second orientation indicia being visually detectable and circumferentially offset from the first orientation indicia;
   wherein except for the second orientation indicia the contact lens comprises a geometric shape, and the second orientation indicia comprises one of an aperture within the geometric shape, a protrusion extending along the contact surface beyond the geometric shape, and a cutout.

4. A method as in claim 3, wherein the first orientation indicia comprises one of an aperture, a protrusion extending along the contact surface, and a cutout.

5. A method of placing a contact lens, the method comprising:
   obtaining a contact lens having a contact surface, an outside surface opposite the contact surface, a first orientation indicia that is visually detectable, and a second orientation indicia that is visually detectable and circumferentially offset from the first orientation indicia, wherein except for the second orientation indicia the contact lens comprises a geometric shape, and the second orientation indicia comprises one of an aperture within the geometric shape, a protrusion extending along the contact surface beyond the geometric shape, and a cutout;
   sensing the second orientation indicia;
   sensing the presence or absence of the first orientation indicia at a position indicative of a proper orientation of the contact lens;
   if the first orientation indicia is present, placing the contact lens on the eye; and
   if the first orientation indicia is absent, reversing the orientation of the contact lens and then placing the contact lens on the eye.

6. A method as in claim 5, wherein the first orientation indicia comprises one of an aperture, a protrusion extending along the contact surface, and a cutout.

* * * * *